(12) United States Patent
Hoshikawa

(10) Patent No.: US 8,635,523 B2
(45) Date of Patent: Jan. 21, 2014

(54) LAYOUT EDITING DEVICE AND COMPUTER PROGRAM PRODUCT

(75) Inventor: Hideyuki Hoshikawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 10 days.

(21) Appl. No.: 13/549,172

(22) Filed: Jul. 13, 2012

(65) Prior Publication Data

US 2013/0016397 A1 Jan. 17, 2013

(30) Foreign Application Priority Data

Jul. 15, 2011 (JP) ................... 2011-156306

(51) Int. Cl.
G06F 17/24 (2006.01)
(52) U.S. Cl.
USPC ........................ 715/235; 358/1.15; 715/243
(58) Field of Classification Search
USPC .................. 358/1.15; 715/235, 243
See application file for complete search history.

(56) References Cited

FOREIGN PATENT DOCUMENTS

| AU | 2008250114 | 6/2010 |
|---|---|---|
| GB | 2422701 | 8/2006 |
| JP | 2003-058524 A | 2/2003 |

OTHER PUBLICATIONS

Extended European Search Report issued in Application No. 12176341.1 on Sep. 13, 2013.

*Primary Examiner* — Eric A Rust
(74) *Attorney, Agent, or Firm* — McCarter & English, LLP

(57) ABSTRACT

A layout editing includes a display portion, an operation portion, a template storage portion, a template acquiring portion that acquires a similar template, an area displaying portion that displays a candidate area on the interactive screen, a setting determination portion that determines whether the candidate area that is displayed will be set on the interactive screen, a object disposing portion that sets the candidate area as the image object area and disposes the object in the set image object area, and an image generating portion that generates image data that describe the image for which the layout has been edited.

15 Claims, 7 Drawing Sheets

LAYOUT EDITING DEVICE AND COMPUTER PROGRAM PRODUCT

CROSS-REFERENCE TO RELATED APPLICATION

This application claims priority to Japanese Patent Application No. 2011-156306, filed Jul. 15, 2011, the disclosure of which is incorporated herein by reference in its entirety.

BACKGROUND

The present disclosure relates to a layout editing device that is provided with a user interface function that allows a user to perform an input operation interactively and also relates to a computer program product that is used by the layout editing device.

An image processing device is known that is provided with a user interface function that allows a user to perform an input operation interactively. As an example of this sort of image processing device, a layout editing device is known that edits a layout of a document or the like in accordance with the input operation by the user. For example, a layout editing device is known that, based on character information that has been input and on the size of a character frame that is designated by data that indicate a standard format (hereinafter called a template), the size of a character in the character information that is disposed within the character frame is determined automatically.

SUMMARY

In a layout editing device that is described above, a document is sometimes created using a template that a user has selected from among a plurality of templates that have been prepared in advance. In that case, it is necessary for the user to search among the plurality of the templates for the template that most closely resembles the standard format (hereinafter called the desired format) that the user wants to use in creating the document. In a case where no template exists that resembles or matches the desired format, not only does the work of searching for the template waste time, but it is also necessary for the user to edit a template to match the desired format.

Thus, with the known layout editing device, in a case where the user edits the layout using a template, it sometimes happens that the operations (for example, template selection, editing, and the like) that the user must perform in order to set the template that will be used constitute a significant burden. The work efficiency of the layout editing may therefore be reduced.

Various exemplary embodiments of the general principles described herein provide a layout editing device that can improve the work efficiency of layout editing by reducing the burden of the operations that the user performs in editing the layout using a template, and also provide a computer program product that is used by the layout editing device.

The exemplary embodiments provide a layout editing device that includes: a display portion that is capable of displaying an interactive screen that enables a user to interactively edit a layout of an image in which image object areas can be set, each of the image object areas being an area in which an object can be disposed, the object including at least one of a character and a picture; an operation portion that enables the user to perform various types of operations at least including an operation on the interactive screen that is displayed by the display portion; a template storage portion that stores at least one template, the at least one template each being a set of standard format data in which is defined template object areas, each of the template object areas being an area in which an object can be disposed; a template acquiring portion that acquires a similar template, the similar template being one of the at least one template stored in the template storage portion and including a corresponding area, the corresponding area being one of the template object areas defined in the similar template and being one of the same as and almost the same as an image object area that has been set on the interactive screen from the operation portion and in which an object has been disposed; an area displaying portion that displays a candidate area on the interactive screen, the candidate area being another of the template object areas defined in the similar template and being different from the corresponding area; a setting determination portion that, in accordance with a command from the operation portion, determines whether the candidate area that is displayed by the area displaying portion will be set on the interactive screen; an object disposing portion that, in a case where it has been determined by the setting determination portion that the candidate area will be set on the interactive screen, sets the candidate area that is displayed by the area displaying portion, as an additional image object area, in the interactive screen and disposes an object which has been one of input and selected from the operation portion in the set additional image object area; and an image generating portion that, based on the objects that have been disposed on the interactive screen, generates image data that describe the image for which the layout has been edited.

The exemplary embodiments also provide a layout editing device that is provided with a display portion that is capable of displaying an interactive screen that enables a user to interactively edit a layout of an image in which image object areas can be set, each of the image object areas being an area in which an object can be disposed, the object including at least one of a character and a picture, the object being disposed in a corresponding one of the at least one image object area, an operation portion that enables the user to perform various types of operations at least including an operation on the interactive screen that is displayed by the display portion, and a template storage portion that stores at least one template, the at least one template each being a set of standard format data in which is defined template object areas, each of the template object areas being an area in which an object can be disposed, comprising: a processor configured to control the layout editing device to; acquiring a similar template, the similar template being one of the at least one template stored in the template storage portion and including a corresponding area, the corresponding area being one of the template object areas defined in the similar template and being one of the same as and almost the same as an image object area that has been set on the interactive screen from the operation portion and in which an object has been disposed; displaying a candidate area on the interactive screen, the candidate area being another of the template object areas defined in the similar template and being different from the corresponding area; determining, in accordance with a command from the operation portion, whether the displayed candidate area will be set on the interactive screen; setting the displayed candidate area as an additional image object area in the interactive screen and disposing an object which has been one of input and selected from the operation portion in the set additional image object area, in a case where it has been determined that the candidate area will be set on the interactive screen; and generating, based on the objects that have been disposed on the interactive screen, image data that describe the image for which the layout has been edited.

The exemplary embodiments also provide a computer program product stored on a non-transitory computer-readable medium, comprising instructions for causing a computer of a layout editing device that is provided with a display portion that is capable of displaying an interactive screen that enables a user to interactively edit a layout of an image in which image object areas can be set, each of the image object areas being an area in which an object can be disposed, the object including at least one of a character and a picture, the object being disposed in a corresponding one of the at least one image object area, an operation portion that enables the user to perform various types of operations at least including an operation on the interactive screen that is displayed by the display portion, and a template storage portion that stores at least one template, the at least one template each being a set of standard format data in which is defined template object areas, each of the template object areas being an area in which an object can be disposed, the layout editing program including instructions that cause a computer of the layout editing device to perform the steps of: acquiring a similar template, the similar template being one of the at least one template stored in the template storage portion and including a corresponding area, the corresponding area being one of the template object areas defined in the similar template and being one of the same as and almost the same as an image object area that has been set on the interactive screen from the operation portion and in which an object has been disposed; displaying a candidate area on the interactive screen, the candidate area being another of the template object areas defined in the similar template and being different from the corresponding area; determining, in accordance with a command from the operation portion, whether the displayed candidate area will be set on the interactive screen; setting the displayed candidate area as an additional image object area in the interactive screen and disposing an object which has been one of input and selected from the operation portion in the set additional image object area, in a case where it has been determined that the candidate area will be set on the interactive screen; and generating, based on the objects that have been disposed on the interactive screen, image data that describe the image for which the layout has been edited.

BRIEF DESCRIPTION OF THE DRAWINGS

Exemplary embodiments of the present disclosure will be described below in detail with reference to the accompanying drawings in which.

DETAILED DESCRIPTION

Figure 1:
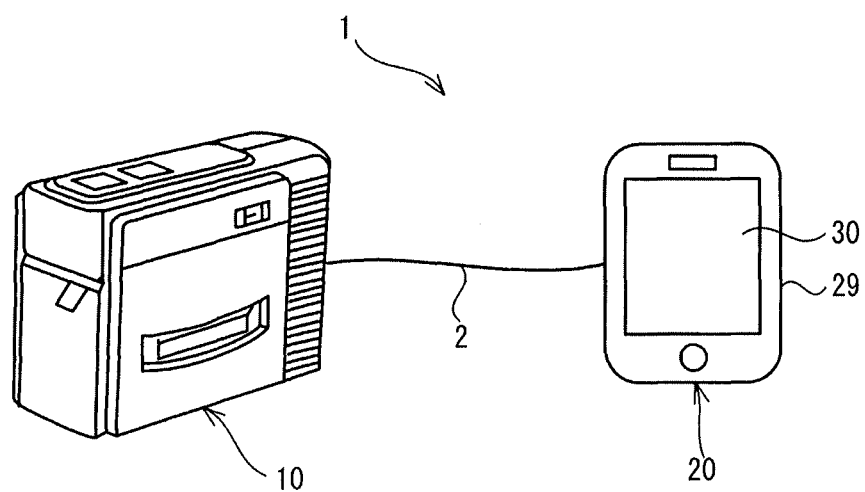
FIG. 1 is a schematic configuration diagram of a printing system 1.

An embodiment of the present disclosure will be explained with reference to the drawings. The drawings will be used for explaining technical features that the present disclosure can use. Device configurations, processing flowcharts, and the like that are shown in the drawings are merely explanatory examples and are not intended to limit the present disclosure to only those examples.

An overview of a printing system 1 will be explained with reference to FIG. 1. The printing system 1 is provided with a printer 10 and a mobile terminal 20 that are connected by a wire or wirelessly. In the present embodiment, the printer 10 and the mobile terminal 20 are connected by a cable 2. The printer 10 is a compact label printer that creates a self-sticking label by printing characters (letters, symbols, graphics, and the like) on a tape that is a long, narrow printing medium. The mobile terminal 20 is a compact computer terminal (for example, a smart phone) that a user uses for editing the label that will be printed.

When the user edits the label on the mobile terminal 20, image data that indicate the edited content are generated and are transmitted to the printer 10 through the cable 2. In the printer 10, the label is created by performing printing processing on the tape, based on the image data that have been received from the mobile terminal 20. Therefore, by operating the mobile terminal 20, the user is able to create the label on the printer 10.

Figure 2:
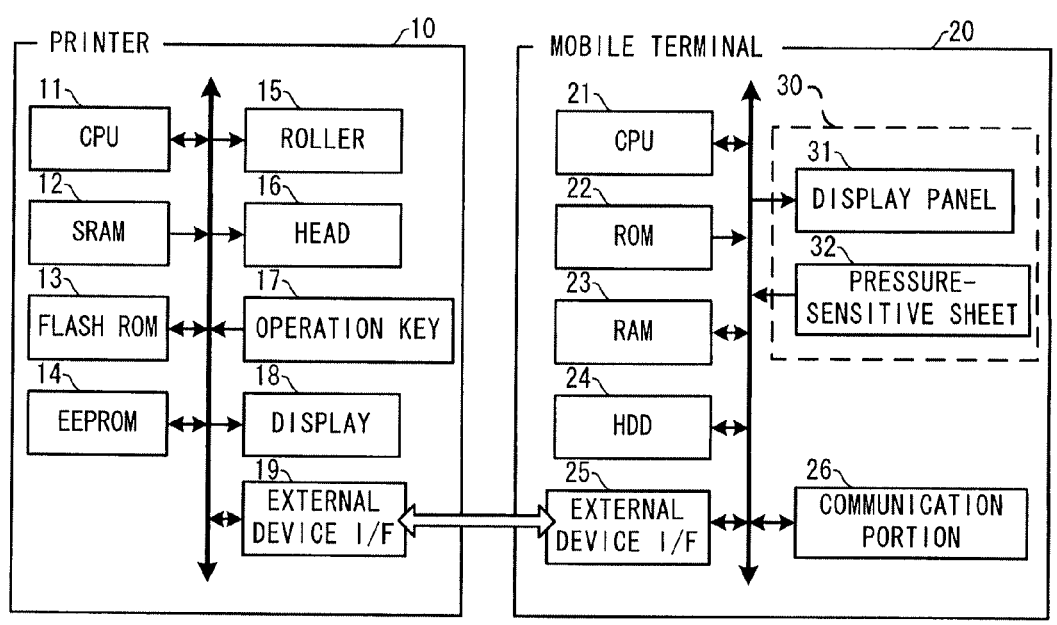
FIG. 2 is a block diagram that shows an electrical configuration of the printing system 1.

An electrical configuration of the printing system 1 will be explained with reference to FIG. 2. The printer 10 is provided with a CPU 11 that performs overall control of the printer 10. The CPU 11 is electrically connected to an SRAM 12, a flash ROM 13, an EEPROM 14, a roller 15, a head 16, an operation key 17, a display 18, and an external device interface (external device I/F) 19.

The SRAM 12 stores a timer, a counter, and temporary data. The flash ROM 13 stores a control program for the CPU 11, as well as a BIOS, an OS, and the like. The EEPROM 14 stores a parameter and initial setting information. The roller 15 feeds the tape, which is contained in a tape cassette (not shown in the drawings) that is mounted in the printer 10. The head 16 performs the printing on the tape that is fed by the roller 15. The external device I/F 19 is a controller for performing communication with the mobile terminal 20 through the cable 2.

In the mobile terminal 20, a CPU 21, a ROM 22, a RAM 23, an HDD 24, an external device I/F 25, a communication portion 26, and a touch panel 30 are electrically connected. The ROM 22 stores a boot program, a BIOS, and the like. The RAM 23 stores a timer, a counter, and temporary data. The HDD 24 stores various types of application programs and an OS. An application program (hereinafter called the editing application) for performing layout editing processing (refer to FIG. 4), which will be described later, is stored in the HDD 24, as are templates, which will be described later, that are used by the editing application. The external device I/F 25 is a controller for performing communication with the printer 10 through the cable 2. The communication portion 26 is a controller for performing communication with another electronic device through a public network that is not shown in the drawings.

The mobile terminal 20 is provided with a media reading device (for example, a CD-ROM drive) that is not shown in the drawings. The mobile terminal 20 uses the media reading device to read an editing application that is stored in a storage medium (for example, a CD-ROM), then installs the application in the HDD 24. The mobile terminal 20 may also receive the editing application through one of the external device I/F 25 and the communication portion 26 and then install the application in the HDD 24.

The mobile terminal 20 is provided with a body 29 that is rectangular in a front view (refer to FIG. 1). The touch panel 30, which is a display unit that can detect a touch of an external object, is provided on the front side of the body 29. The touch panel 30 has a rectangular display area that corresponds to the shape of the body 29. In the touch panel 30, a substantially transparent pressure-sensitive sheet 32 that detects the touch of the external object is laminated over a display panel 31 that displays a screen. Based on the position of the touch of the external object that is specified by the pressure-sensitive sheet 32, the CPU 21 is able to determine that the user has performed an input operation.

The mobile terminal 20 according to the present disclosure is provided with a user interface function that allows the user to perform an input operation interactively. When the editing application is launched in the mobile terminal 20, an interactive screen is displayed on the touch panel 30 for the user to interactively edit the layout of a label, for example, that includes at least one object and that will be printed by the printer 10. The object is a set of data that describe one of a text (a string of characters such as letters, graphics, symbols, and the like) or a picture. The user edits the layout of the label by performing various types of operations on the interactive screen of the touch panel 30.

Figure 3:
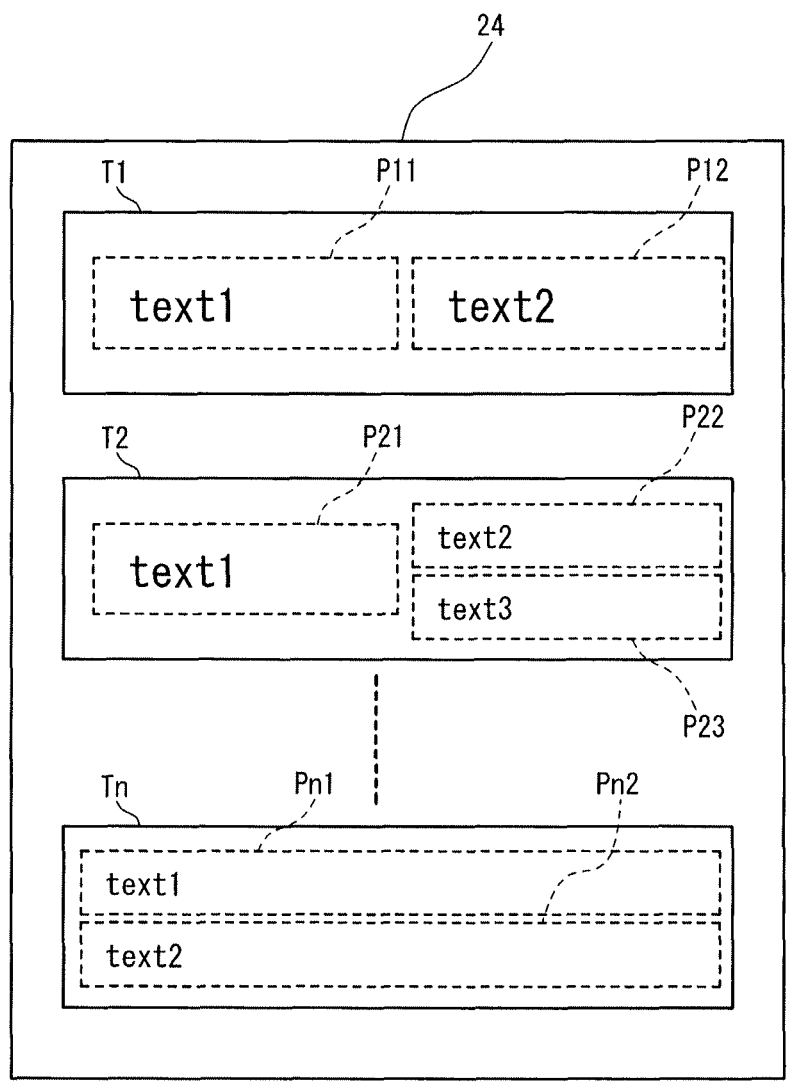
FIG. 3 is a figure that shows examples of templates T1 to Tn that are stored in an HDD 24.

The templates that are stored in the HDD 24 will be explained with reference to FIG. 3. Each of the templates according to the present disclosure is a set of data for a standard format that defines an object area, which is an area in which the object will be disposed. In the example that is shown in FIG. 3, a plurality (n) of templates T1 to Tn for label editing are stored in the HDD 24. In each of the templates T1 to Tn, the number of the object areas, the setting range (position and size) of each of the object areas, the attribute (picture or text) of the object that will be disposed in each of the object areas, the order in which the object areas will have the objects disposed in them, and the like are defined.

For example, the template T1 has two object areas P11, P12 for inputting texts. The template T2 has three object areas P21, P22, P23 for inputting texts. The template Tn has two object areas Pn1, Pn2 for inputting texts. The user can easily and accurately perform layout editing for labels by using one of the templates T1 to Tn.

Specifically, in a case where the layout editing is performed using the template T1, the user can dispose two objects such that they are placed side by side on the left and right, in equal sizes, without assigning the object areas. In a case where the layout editing is performed using the template T2, the user can dispose one object on the left side and two objects on the right side, without assigning the object areas. The objects on the right side can also be made smaller than the object on the left side, and they can be disposed such that they are aligned one above the other, in equal sizes.

The layout editing processing that is performed in the mobile terminal 20 will be explained with reference to FIGS. 4 to 7. The layout editing processing (FIG. 4) is performed by the CPU 21 when the editing application is launched in the mobile terminal 20. At this time, an interactive screen is displayed on the touch panel 30 that may include, for example, a label image 100 (refer to FIG. 5) in which an object has not been disposed. The user performs various types of operations on the interactive screen that is displayed on the touch panel 30.

Figure 4:
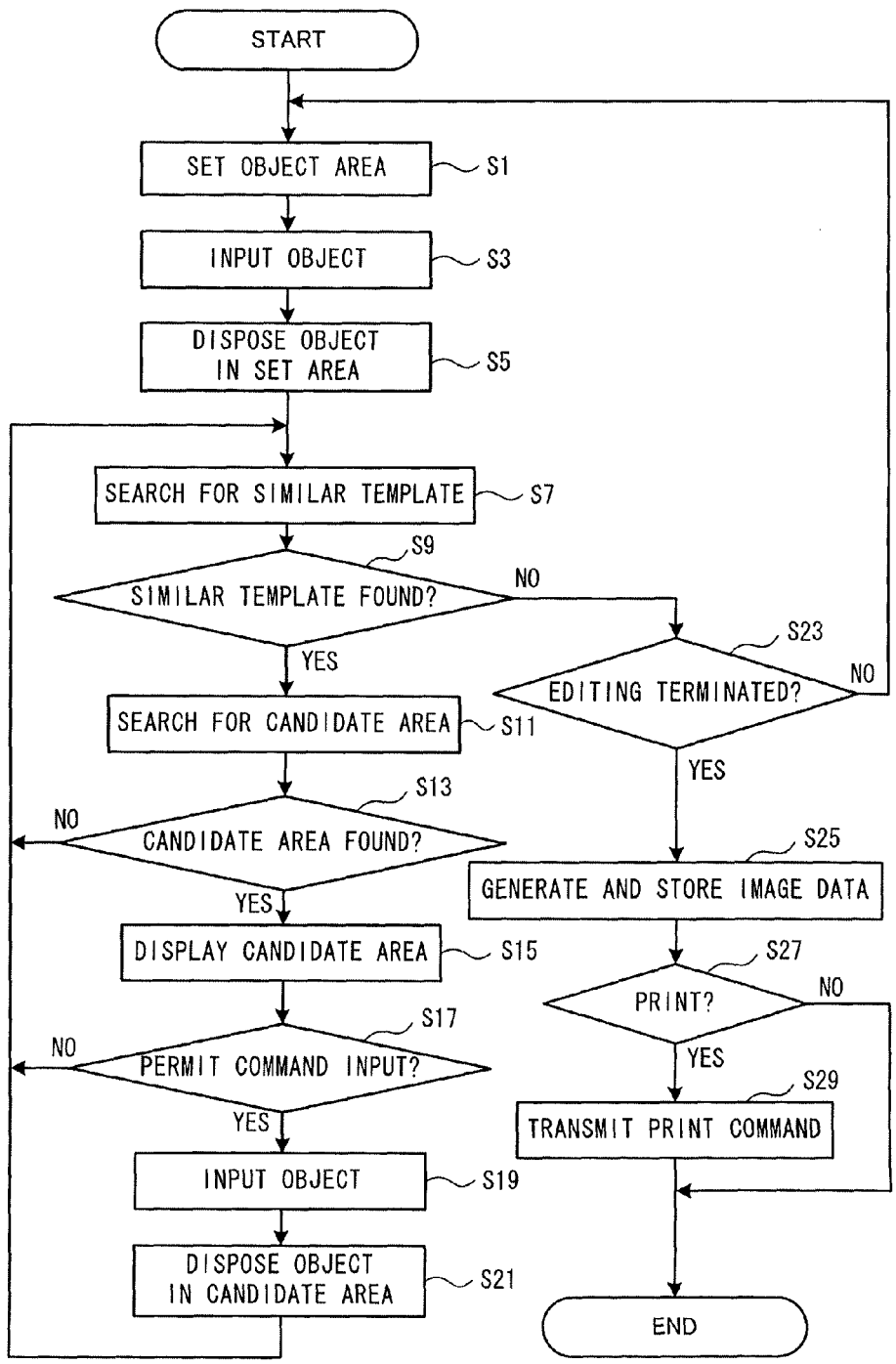
FIG. 4 is a flowchart of layout editing processing.

As shown in FIG. 4, in the layout editing processing, first, setting of an object area is performed (Step S1). Specifically, when the user designates a position for an object area on the interactive screen that is displayed on the touch panel 30, an object area is set at the designated position. Next, input of an object is performed (Step S3). Specifically, the user inputs a new text or picture as an object by operating icons, menus, a soft keyboard, and the like (not shown in the drawings) that are displayed on the touch panel 30. Note that the user may also input an object by selecting an existing text or picture on the touch panel 30. The object that was input at Step S3 is disposed in the object area (the set area) that was set at Step S1 (Step S5).

Figure 5:
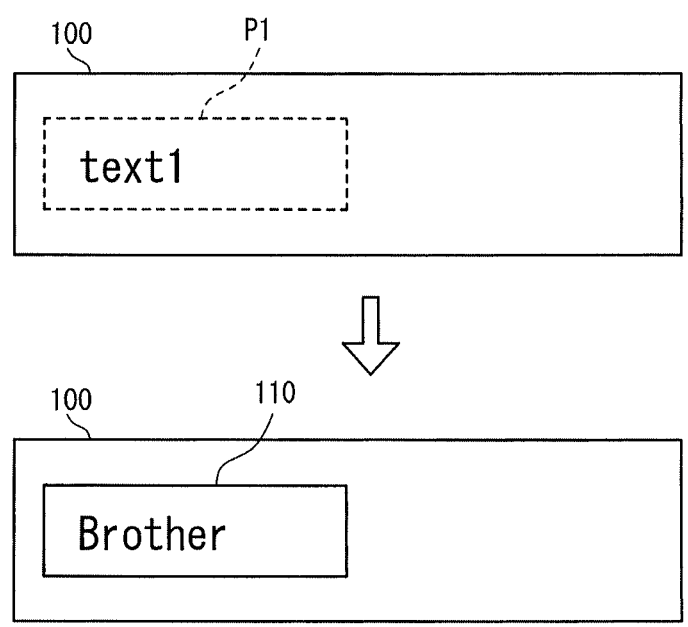
FIG. 5 is a specific example that shows a process of editing a layout of a label image 100.

In the example that is shown in FIG. 5, the user has designated a position on the left side of the label image 100 on touch panel 30, and a rectangular text input area text1 (an object area P1) has been set with the designated position as its center (Step S1). When the user inputs "Brother" on the touch panel 30 (Step S3), an object 110 ("Brother") is disposed in the object area P1 (text1) (Step S5).

Returning to FIG. 4, after Step S5 is performed, a search for a similar template is performed (Step S7). A similar template is a template, among the templates T1 to Tn that are stored in the HDD 24, that contains an object area (hereinafter called the corresponding area) that is the same or approximately the same as the object area that has been set on the interactive screen. Based on the results of the search at Step S7, a determination is made as to whether a similar template exists (Step S9). Note that the determination as to whether the object areas are the same or approximately the same may be made by a known technique, and the user or a manufacturer may also determine the degree of similarity between the two object areas as desired.

In a case where a similar template exists that was found by the search at Step S7 (YES at Step S9), a search for a candidate area is performed based on the similar template that was found (Step S11). A candidate area is an object area, among the object areas that have been defined in the similar template, that is different from the corresponding area. Based on the results of the search at Step S11, a determination is made as to whether a candidate area exists (Step S13). In a case where a candidate area exists that was found by the search at Step S11 (YES at Step S13), the candidate area that was found is displayed on the interactive screen (Step S15).

After Step S15 is performed, a determination is made as to whether a permit command has been input for the candidate area (Step S17). The permit command for the candidate area is a command to take the candidate area that was displayed at Step S15 and set it on the interactive screen. In a case where the permit command for the candidate area has been input from the touch panel 30 (YES at Step S17), the input of an object is performed in the same manner as at Step S3 (Step S19). The object that is input at Step S19 is disposed in the candidate area that was displayed at Step S15 (Step S21).

Figure 6:
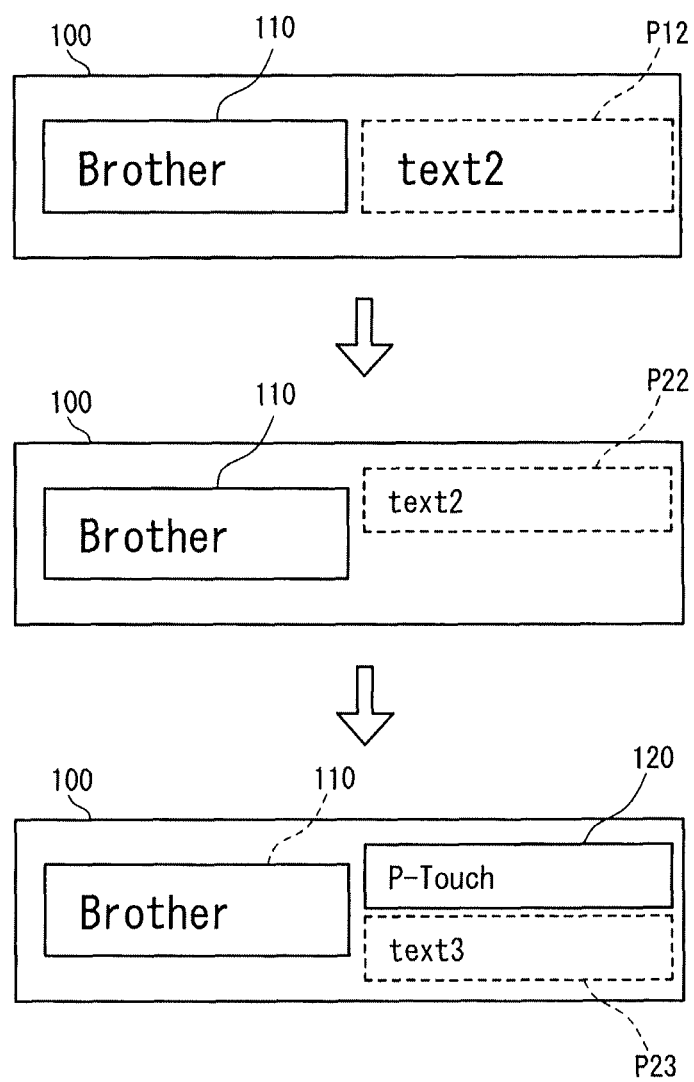
FIG. 6 is a specific example that shows the process of editing the layout of the label image 100.

In the example that is shown in FIG. 6, the object 110 has been disposed in the object area P1 (refer to FIG. 5) in the label image 100. In this case, the similar template that includes the corresponding area for the object area P1 was found in the HDD 24. As an example, the template T1 (refer to FIG. 3), which includes the object area P11 that is equivalent to the corresponding area for the object area P1, is found by the search (Step S7; YES at Step S9).

Next, a search is performed for a candidate area in the template T1, and the search finds the object area P12, which is different from the corresponding area (the object area P11) (Step S11; YES at Step S13). The object area P12, which is the candidate area, is displayed superimposed on the label image 100 (Step S15). At this time, a Yes and No selection buttons for inputting a command indicating whether the user will permit the candidate area to be set on the interactive screen are displayed on the interactive screen, although this is not shown in the drawings. In a case where the user presses the Yes selection button (YES at Step S17), the text object that has been input on the touch panel 30 is disposed in the object area P12 (text2) (Steps S19, S21).

Returning to FIG. 4, in a case where it has been determined that no candidate area exists (NO at Step S13), and in a case where it has been determined that the permit command for the candidate area has not been input (NO at Step S17), the processing returns to Step S7. In these cases, the search for a similar template is performed again, for another similar template (that is, a similar template that is different from the similar template that has already been acquired). In a case where the search finds another similar template (YES at Step S9), the candidate area is displayed based on the similar template that has been found (Steps S11 to S15). In a case where the permit command for the candidate area has been input (YES at Step S17), the object is disposed in the displayed candidate area (Steps S19, S21).

In the example that is shown in FIG. 6, in a case where the user presses the No selection button (NO at Step S17) while the object area P12 is being displayed as the candidate area, the search for a similar template is performed again, for a template other than the template T1 (refer to FIG. 3). As an example, the template T2 (refer to FIG. 3), which includes the object area P21 that is equivalent to the corresponding area for the object area P1, is found by the search (Step S7; YES at Step S9).

Next, a search is performed for a candidate area in the template T2, and the search finds the object areas P22, P23, which are different from the corresponding area (the object area P21) (Step S11; YES at Step S13). In a case like this, where a plurality of object areas are found, the object area that comes first in the aforementioned order in which the objects will be disposed is acquired as the candidate area. Therefore, in the case where the object areas P22, P23 are found, the object area P22, which comes first in the order in which the objects will be disposed, is displayed as the candidate area, superimposed on the label image 100 (Step S15). In a case where the user presses the aforementioned Yes selection button (YES at Step S17), when the text "P-touch" is input on the touch panel 30 (Step S19), an input object 120 ("P-touch") is disposed in the object area P22 (text2) (Step S21).

Returning to FIG. 4, after Step S21 is performed, the processing returns to Step S7, and the search for a similar template is performed again. In other words, the search is performed again for a new similar template that includes corresponding areas for all of the object areas that have been set on the interactive screen, including the object that was newly disposed at Step S21 (that is, the newly set object area). In a case where a new similar template is found by the search (YES at Step S9), the candidate area is displayed based on the similar template that has been found (Steps S11 to S15). In a case where the permit command for the candidate area has been input (YES at Step S17), the object is disposed in the displayed candidate area (Steps S19, S21).

In the example that is shown in FIG. 6, in the label image 100, the object 110 is disposed in the object area P1 (refer to FIG. 5), and the object 120 is disposed in the object area P22. A search of the HDD 24 is accordingly performed for a similar template that includes corresponding areas for the object areas P1, P22. The search once again finds the template T2 (refer to FIG. 3), which includes the object areas P21, P22, which are the respective corresponding areas for the object areas P1, P22 (Step S7; YES at Step S9).

Next, the search for the candidate area in the template T2 is performed, and the object area P23, which is different from the corresponding areas (the object areas P21, P22), is found (Step S11; YES at Step S13). The object area P23, which is the candidate area, is displayed superimposed on the label image 100 (Step S15). In a case where the user presses the Yes selection button (YES at Step S17), the text object that has been input on the touch panel 30 is disposed in the object area P23 (text3) (Steps S19, S21).

Returning to FIG. 4, in a case where it has been determined that no similar template exists (NO at Step S9), a determination is made as to whether the editing has been terminated (Step S23). For example, in a case where a command has been input from the touch panel 30 to terminate the editing, a determination is made that the editing has been terminated (YES at Step S23), image data that describe the layout of the label are generated based on the objects that have been disposed on the interactive screen (that is, the current label image 100), and the image data are stored in the HDD 24 (Step S25).

In a case where the editing has not been terminated (NO at Step S23), the processing returns to Step S1. In that case, at Step S1, the touch panel 30 displays a message that prompts the user to perform the object area setting operation (for example, "Please set an object area," or the like). If the user responds by designating on the touch panel 30 the position of the next object to be disposed, an object area is set at the designated position.

After Step S25 is performed, a determination is made as to whether printing will be performed (Step S27). For example, in a case where a command to perform printing has been input from the touch panel 30, a determination is made that printing will be performed (YES at Step S27), and a print command that is generated based on the image data that were generated at Step S25 is transmitted to the printer 10 through the cable 2 (Step S29). In the present embodiment, the editing application has a known printer driver function. The print command that is described above is generated by the printer driver function of the editing application. In a case where printing will not be performed (NO at Step S27), and after Step S29 is performed, the layout editing processing (FIG. 4) is terminated.

Note that at the aforementioned Steps S5, S21, the user can modify the sizes and positions of the objects that are disposed in the label image 100 (that is, the object areas in which the objects have been disposed) by operating the touch panel 30. In that case as well, the optimum candidate area is displayed based on the similar template that corresponds to the modified object areas.

Figure 7:
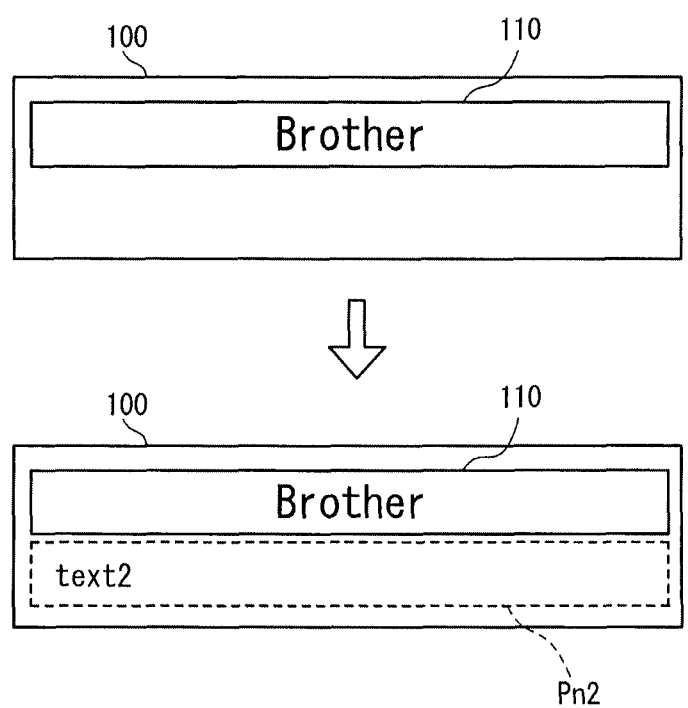
FIG. 7 is a specific example that shows the process of editing the layout of the label image 100.

In the example that is shown in FIG. 7, after disposing the object 110 ("Brother") in the object area P1 (text1) in the label image 100, the user has modified the shape of the object 110 (that is, the object area P1) to make it horizontally long, with a smaller width in the vertical dimension (Step S5). In this case, the template Tn (refer to FIG. 3), which includes the object area Pn1, is found by the search for the similar template (Step S7; YES at Step S9). The object area Pn2 (refer to FIG. 3) is found by the search for the candidate area (Step S11; YES at Step S13) and is displayed superimposed on the label image 100 (Step S15).

As explained previously, according to the present embodiment, the object that has been input or selected on the interactive screen of the touch panel 30 is disposed in the object area that has been set on the touch panel 30 (Steps S1 to S5). The similar template that includes the corresponding area for the object area that has been set on the interactive screen is acquired from the HDD 24 (Step S7). In a case where an object has been disposed on the interactive screen, a candidate area is displayed on the interactive screen based on the acquired similar template (Step S15). In a case where it has been determined that a candidate area has been set on the interactive screen, an object is disposed in the displayed candidate area (Steps S17, S19). The image data for the label image 100 are generated based on the objects on the interactive screen (Step S25).

In other words, when the user disposes an object on the interactive screen, the next object area is automatically displayed based on a similar template that is approximately the same as the layout that the user is trying to edit. The user is able to dispose the object in the displayed object area, so it is not necessary for the user to set the next object area on the interactive screen. Therefore, for the user who edits the layout using the template, the burden of the operations is reduced, and the work efficiency of the layout editing can be improved.

In particular, because the layout editing that is described above can be performed by simple operations using a small work area, it is not necessary to provide an operation portion with advanced functions and a large display portion. Therefore, the layout editing can be performed accurately and easily, even with a computer terminal that is provided with a small display (for example, a smart phone, a mobile telephone, a PDA, or the like), and the operating burden during the layout editing can be limited.

In a case where it has been determined that a candidate area will not be set on the interactive screen, another similar template that is different from the already acquired similar template is acquired from the HDD 24 (NO at Step S17; Step S7). In that case, a candidate area that is defined in the newly acquired similar template is displayed on the interactive screen. The user can therefore set the candidate area on the interactive screen using a preferred template.

In a case where it has been determined that a candidate area will not be set on the interactive screen, the user is prompted to perform the object area setting operation (NO at Step S17; NO at Step S23; Step S1). An object is disposed in the object area that has been set in response to the prompt. Therefore, in a case where the user has rejected the setting of the candidate area, the user is prompted to set the next object area, making it possible for the layout editing to proceed smoothly.

Based on a plurality of the object areas that have been set on the interactive screen, a similar template that includes all of the corresponding areas is acquired from the HDD 24 (Step S7). Therefore, the user can set a more suitable candidate area on the interactive screen by using a similar template that corresponds to all of the object areas that have been set on the interactive screen.

In a case where the command to perform printing has been input, the print command that causes the label image 100 that is described by the image data to be printed is transmitted to the printer 10 (YES at Step S27; Step S29). Therefore, the image data that will be printed by the printer 10 can be edited on the mobile terminal 20. In particular, in a case where the printer 10 that the user is carrying is a compact label printer, the user can edit and create labels at the user's destination by connecting the mobile terminal 20 to the printer 10.

The layout editing device according to the present disclosure is not limited to the embodiment that is described above, and various types of modifications can be made. The layout editing device is not limited to being the mobile terminal 20, and it may also be a computer device (for example, a PC or the like) that is provided with a large touch panel. The object areas are not limited to being rectangular, and various types of shapes in which the objects can be disposed (for example, a circle, a polygon, a star, and the like) can be used. The display portion and the operation portion are not limited to being the touch panel 30, and both the display portion and the operation portion may also be stand-alone portions.

The layout editing device is not limited to the layout editing of the label image 100, and it can also be used for layout editing of an image that is used for a purpose other than printing and a label. Note that the mobile terminal 20 can perform the layout editing processing (FIG. 4) on its own, even in a state in which the mobile terminal 20 is not connected to the printer 10.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A layout editing device comprising:
a display portion that is capable of displaying an interactive screen that enables a user to interactively edit a layout of an image in which image object areas can be set, each of the image object areas being an area in which an object can be disposed, the object including at least one of a character and a picture;
an operation portion that enables the user to perform various types of operations at least including an operation on the interactive screen that is displayed by the display portion;
a template storage portion that stores at least one template, the at least one template each being a set of standard format data in which is defined template object areas, each of the template object areas being an area in which an object can be disposed;
a template acquiring portion that acquires a similar template, the similar template being one of the at least one template stored in the template storage portion and including a corresponding area, the corresponding area being one of the template object areas defined in the similar template and being one of the same as and almost the same as an image object area that has been set on the interactive screen from the operation portion and in which an object has been disposed;
an area displaying portion that displays a candidate area on the interactive screen, the candidate area being another of the template object areas defined in the similar template and being different from the corresponding area;
a setting determination portion that, in accordance with a command from the operation portion, determines whether the candidate area that is displayed by the area displaying portion will be set on the interactive screen;
an object disposing portion that, in a case where it has been determined by the setting determination portion that the candidate area will be set on the interactive screen, sets the candidate area that is displayed by the area displaying portion, as an additional image object area, in the interactive screen and disposes an object which has been one of input and selected from the operation portion in the set additional image object area; and
an image generating portion that, based on the objects that have been disposed on the interactive screen, generates image data that describe the image for which the layout has been edited.

2. The layout editing device according to claim 1, wherein:
the template acquiring portion, in a case where it has been determined by the setting determination portion that the candidate area will not be set on the interactive screen, acquires from the template storage portion another similar template that is different from the similar template of which the candidate area has been determined not to be set; and the area displaying portion, in a case where the different similar template has been acquired by the template acquiring portion, displays on the interactive screen a candidate area that is defined in the acquired different similar template.

3. The layout editing device according to claim 1, further comprising a setting prompt portion that, in a case where it has been determined by the setting determination portion that the candidate area will not be set on the interactive screen, prompts the user to perform an operation that sets another image object area, wherein the object disposing portion disposes an object in the set image object area that has been set on the interactive screen from the operation portion in response to the prompt from the setting prompt portion.

4. The layout editing device according to claim 1, wherein the template acquiring portion, in a case where image object areas have been set on the interactive screen, acquires from the template storage portion, as the similar template, one of the at least one template that includes corresponding areas that respectively correspond to the image object areas that have been set on the interactive screen.

5. The layout editing device according to claim 1, wherein the layout editing device is a mobile terminal that is connectable to a printer, and the layout editing device further comprises a command transmitting portion that, in a case where a command to perform printing has been input from the operation portion, transmits to the printer a command that causes the printer to print the image that is described by the image data that have been generated by the image generating portion.

6. A layout editing device that is provided with a display portion that is capable of displaying an interactive screen that enables a user to interactively edit a layout of an image in which image object areas can be set, each of the image object areas being an area in which an object can be disposed, the object including at least one of a character and a picture, the object being disposed in a corresponding one of the at least one image object area, an operation portion that enables the user to perform various types of operations at least including an operation on the interactive screen that is displayed by the display portion, and a template storage portion that stores at least one template, the at least one template each being a set of standard format data in which is defined template object areas, each of the template object areas being an area in which an object can be disposed, comprising:

a processor configured to control the layout editing device to;

acquiring a similar template, the similar template being one of the at least one template stored in the template storage portion and including a corresponding area, the corresponding area being one of the template object areas defined in the similar template and being one of the same as and almost the same as an image object area that has been set on the interactive screen from the operation portion and in which an object has been disposed;

displaying a candidate area on the interactive screen, the candidate area being another of the template object areas defined in the similar template and being different from the corresponding area;

determining, in accordance with a command from the operation portion, whether the displayed candidate area will be set on the interactive screen;

setting the displayed candidate area as an additional image object area in the interactive screen and disposing an object which has been one of input and selected from the operation portion in the set additional image object area, in a case where it has been determined that the candidate area will be set on the interactive screen; and generating, based on the objects that have been disposed on the interactive screen, image data that describe the image for which the layout has been edited.

7. The layout editing device according to claim 6, wherein: acquiring from the template storage portion another similar template that is different from the similar template of which the candidate area has been determined not to be set, in a case where it has been determined that the candidate area will not be set on the interactive screen; and displaying on the interactive screen a candidate area that is defined in the acquired different similar template, in a case where the different similar template has been acquired.

8. The layout editing device according to claim 6, the processor further configured to control the layout editing device to prompting the user to perform an operation that sets another image object area, in a case where it has been determined that the candidate area will not be set on the interactive screen, wherein disposing an object in the set image object area that has been set on the interactive screen from the operation portion in response to the prompting to set the image object area.

9. The layout editing device according to claim 6, wherein acquiring from the template storage portion, as the similar template, one of the at least one template that includes corresponding areas that respectively correspond to the image object areas that have been set on the interactive screen, in a case where image object areas have been set on the interactive screen.

10. The layout editing device according to claim 6, the processor further configured to control the layout editing device to transmitting, to a printer that is connectable to a mobile terminal that is the layout editing device, a command that causes the printer to print the image that is described by the generated image data, in a case where a command to perform printing has been input from the operation portion.

11. A computer program product stored on a non-transitory computer-readable medium, comprising instructions for causing a computer of a layout editing device that is provided with a display portion that is capable of displaying an interactive screen that enables a user to interactively edit a layout of an image in which image object areas can be set, each of the image object areas being an area in which an object can be disposed, the object including at least one of a character and a picture, the object being disposed in a corresponding one of the at least one image object area, an operation portion that enables the user to perform various types of operations at least including an operation on the interactive screen that is displayed by the display portion, and a template storage portion that stores at least one template, the at least one template each being a set of standard format data in which is defined template object areas, each of the template object areas being an area in which an object can be disposed, the layout editing program including instructions that cause a computer of the layout editing device to perform the steps of:
  acquiring a similar template, the similar template being one of the at least one template stored in the template storage portion and including a corresponding area, the corresponding area being one of the template object areas defined in the similar template and being one of the same as and almost the same as an image object area that has been set on the interactive screen from the operation portion and in which an object has been disposed;
  displaying a candidate area on the interactive screen, the candidate area being another of the template object areas defined in the similar template and being different from the corresponding area;
  determining, in accordance with a command from the operation portion, whether the displayed candidate area will be set on the interactive screen;
  setting the displayed candidate area as an additional image object area in the interactive screen and disposing an object which has been one of input and selected from the operation portion in the set additional image object area, in a case where it has been determined that the candidate area will be set on the interactive screen; and
  generating, based on the objects that have been disposed on the interactive screen, image data that describe the image for which the layout has been edited.

12. The computer program product according to claim 11, wherein:
  acquiring from the template storage portion another similar template that is different from the similar template of which the candidate area has been determined not to be set, in a case where it has been determined that the candidate area will not be set on the interactive screen; and
  displaying on the interactive screen a candidate area that is defined in the acquired different similar template, in a case where the different similar template has been acquired.

13. The computer program product according to claim 11, further comprising instructions for causing the computer to execute the step of
  prompting the user to perform an operation that sets another image object area, in a case where it has been determined that the candidate area will not be set on the interactive screen,
  wherein
  disposing an object in the set image object area that has been set on the interactive screen from the operation portion in response to the prompting to set the image object area.

14. The computer program product according to claim 11, wherein
  acquiring from the template storage portion, as the similar template, one of the at least one template that includes corresponding areas that respectively correspond to the image object areas that have been set on the interactive screen, in a case where image object areas have been set on the interactive screen.

15. The computer program product according to claim 11, further comprising instructions for causing the computer to execute the step of
  transmitting, to a printer that is connectable to a mobile terminal that is the layout editing device, a command that causes the printer to print the image that is described by the generated image data, in a case where a command to perform printing has been input from the operation portion.

* * * * *